US008600991B2

(12) United States Patent
Nakaoka

(10) Patent No.: US 8,600,991 B2
(45) Date of Patent: Dec. 3, 2013

(54) CONTENTS INFORMATION REPRODUCING APPARATUS, CONTENTS INFORMATION REPRODUCING SYSTEM, CONTENTS INFORMATION REPRODUCING METHOD, CONTENTS INFORMATION REPRODUCING PROGRAM, RECORDING MEDIUM AND INFORMATION PROCESSING APPARATUS

(75) Inventor: Hideaki Nakaoka, Osaka (JP)

(73) Assignee: Panasonic Corporation, Osaka (JP)

( * ) Notice: Subject to any disclaimer, the term of this patent is extended or adjusted under 35 U.S.C. 154(b) by 640 days.

(21) Appl. No.: 12/496,780

(22) Filed: Jul. 2, 2009

(65) Prior Publication Data
US 2010/0011023 A1    Jan. 14, 2010

(30) Foreign Application Priority Data

Jul. 8, 2008 (JP) .................................. 2008-177993

(51) Int. Cl.
G06F 7/00 (2006.01)

(52) U.S. Cl.
USPC ............... 707/736; 707/758; 707/769; 725/9; 725/10; 382/100; 382/115

(58) Field of Classification Search
USPC ......... 707/999.104, 736, 758, 769; 725/9, 10; 382/100, 115
See application file for complete search history.

(56) References Cited

U.S. PATENT DOCUMENTS

| 2005/0289582 | A1* | 12/2005 | Tavares et al. ................... 725/10 |
| 2006/0026529 | A1* | 2/2006 | Paulsen et al. ................. 715/776 |
| 2007/0249367 | A1 | 10/2007 | Sato et al. |
| 2008/0133451 | A1* | 6/2008 | Fernandez ......................... 707/1 |
| 2009/0023422 | A1* | 1/2009 | MacInnis et al. ............. 455/411 |
| 2009/0089833 | A1 | 4/2009 | Saito et al. |
| 2009/0119369 | A1* | 5/2009 | Chou ............................ 709/205 |

FOREIGN PATENT DOCUMENTS

| JP | 2005-210155 | 8/2005 |
| JP | 2007-140670 | 6/2007 |
| JP | 2007-151057 | 6/2007 |
| JP | 2008-234431 | 10/2008 |
| JP | 2009-134671 | 6/2009 |
| JP | 2009-211387 | 9/2009 |

OTHER PUBLICATIONS

English language Abstract of JP 2007-140670, Jun. 7, 2007.

* cited by examiner

Primary Examiner — Hosain Alam
Assistant Examiner — Jieying Tang
(74) Attorney, Agent, or Firm — Greenblum & Bernstein, P.L.C.

(57) ABSTRACT

A content information reproducing apparatus, a content information reproducing system, a content information reproducing method, a content information reproducing program, a recording medium storing the program, and an information processing apparatus facilitate introductory comment creators creating introductory information while creating introductory information reflecting the intent of the content distributor. A content information reproducing apparatus has a reception unit that receives an introductory information template set containing various introductory information templates that are configured for particular scenes according to different biometric information levels, an introductory information production unit that determines a biometric information level from the biometric information of the user viewing the content, extracts an introductory information template corresponding to the biometric information level from the introductory information template set, correlates the biometric information level and the extracted introductory information template, and creates introductory information, and a transmission unit that outputs the introductory information when content reproduction ends.

19 Claims, 14 Drawing Sheets

Fig. 3

INFORMATION BEFORE PROCESSING

| CONTENT ID | SCENE TIME INFORMATION | SCENE ID | LEVEL ID | INTRODUCTORY COMMENT TEMPLATE ID |
|---|---|---|---|---|
| XXX | 10:00~11:30 (SCENE 1) | IDT-1 | 1 | IDST-1 |
| | | | 2 | IDST-2 |
| | | | 3 | IDST-3 |
| | 12:00~15:00 (SCENE 2) | IDT-2 | 1 | IDST-4 |
| | | | 2 | IDST-5 |
| | | | 3 | IDST-6 |
| | 17:00~18:00 (SCENE 3) | IDT-3 | 1 | IDST-7 |
| | | | 2 | IDST-8 |
| | | | 3 | IDST-9 |
| ... | ... | ... | ... | ... |

| INTRODUCTORY COMMENT TEMPLATE ID | INTRODUCTORY COMMENT TEMPLATE |
|---|---|
| IDST-1 | NOT VERY MOVING |
| IDST-2 | OUTSTANDING! |
| IDST-3 | OUTSTANDING! VERY MOVING. |
| ... | ... |

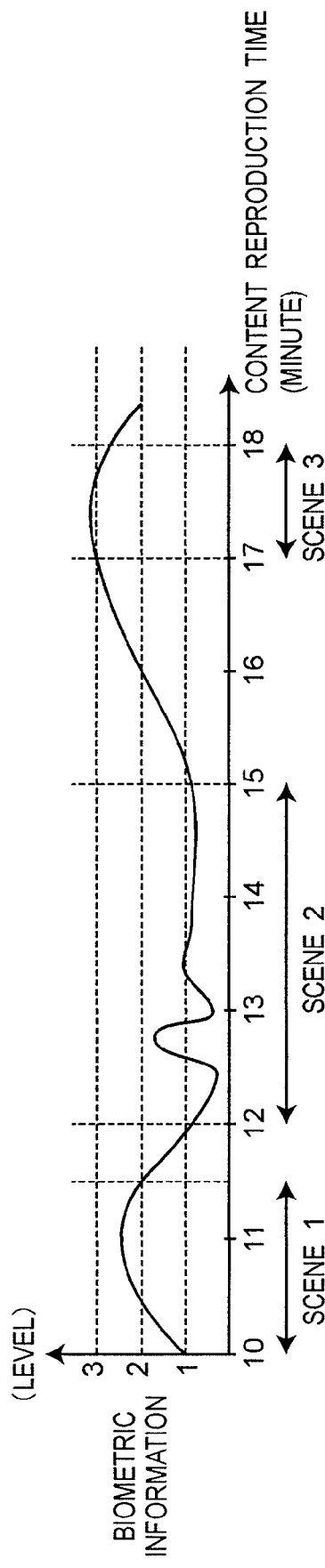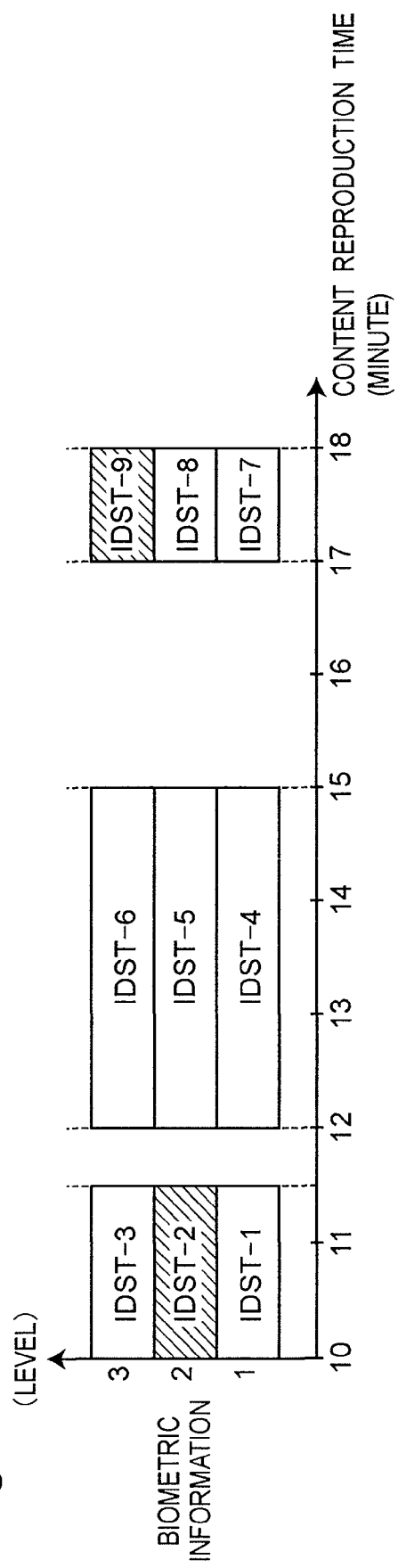

Fig. 5

INFORMATION AFTER PRIMARY PROCESSING

| CONTENT ID | SCENE TIME INFORMATION | SCENE ID | LEVEL ID | INTRODUCTORY COMMENT TEMPLATE ID | BIOMETRIC INFORMATION LEVEL OF USER |
|---|---|---|---|---|---|
| XXX | 10:00~11:30 (SCENE 1) | IDT-1 | 1 | IDST-1 | × |
| | | | 2 | IDST-2 | ○ |
| | | | 3 | IDST-3 | × |
| | 12:00~15:00 (SCENE 2) | IDT-2 | 1 | IDST-4 | × |
| | | | 2 | IDST-5 | × |
| | | | 3 | IDST-6 | × |
| | 17:00~18:00 (SCENE 3) | IDT-2 | 1 | IDST-7 | × |
| | | | 2 | IDST-8 | × |
| | | | 3 | IDST-9 | ○ |
| ... | ... | ... | ... | ... | ... |

| INTRODUCTORY COMMENT TEMPLATE ID | INTRODUCTORY COMMENT TEMPLATE |
|---|---|
| IDST-1 | NOT VERY MOVING |
| IDST-2 | OUTSTANDING! |
| IDST-3 | OUTSTANDING! VERY MOVING. |
| ... | ... |

Fig. 6

INFORMATION AFTER SECONDARY PROCESSING

| CONTENT ID | SCENE TIME INFORMATION | SCENE ID | LEVEL ID | INTRODUCTORY COMMENT TEMPLATE ID |
|---|---|---|---|---|
| XXX | 10:00~11:30 (SCENE 1) | IDT-1 | 1 | IDST-1 |
| | | | 2 | IDST-2 |
| | | | 3 | IDST-3 |
| | 12:00~15:00 (SCENE 2) | IDT-2 | 1 | IDST-4 |
| | | | 2 | IDST-5 |
| | | | 3 | IDST-6 |
| | 17:00~18:00 (SCENE 3) | IDT-3 | 1 | IDST-7 |
| | | | 2 | IDST-8 |
| | | | 3 | IDST-9 |
| ... | ... | ... | ... | ... |

| INTRODUCTORY COMMENT TEMPLATE ID | INTRODUCTORY COMMENT TEMPLATE |
|---|---|
| IDST-1 | NOT VERY MOVING |
| IDST-2 | OUTSTANDING! |
| IDST-3 | OUTSTANDING! VERY MOVING |
| ... | ... |

Fig.7A

| CONTENT ID | SCENE ID | LEVEL ID 20 | REPRESENTATIVE IMAGE ID 21 | INTRODUCTORY COMMENT ID 22 |
|---|---|---|---|---|

| INTRODUCTORY COMMENT ID 23 | INTRODUCTORY COMMENT 24 |
|---|---|

Fig.7B

| CONTENT ID | SCENE ID | LEVEL ID 20 | REPRESENTATIVE IMAGE ID 21 | INTRODUCTORY COMMENT ID 22 |
|---|---|---|---|---|
| XXX | IDT-1 (SCENE 1) | 2 | IDP-1 | IDS-1 |
|  | IDT-3 (SCENE 3) | 3 | IDP-2 | IDS-2 |
|  | ... | ... | ... | ... |

| INTRODUCTORY COMMENT ID 23 | INTRODUCTORY COMMENT 24 |
|---|---|
| IDS-1 | OUTSTANDING ! |
| IDS-2 | ......... |
| ... | ... |

Fig. 11

| CONTENT ID | SCENE TIME INFORMATION | SCENE ID | LEVEL ID | EFFECT TEMPLATE ID |
|---|---|---|---|---|
| XXX | 10:00~11:30 (SCENE 1) | IDT-1 | 1 | IDET-1 |
| | | | 2 | IDET-2 |
| | | | 3 | IDET-3 |
| | 12:00~15:00 (SCENE 2) | IDT-2 | 1 | IDET-4 |
| | | | 2 | IDET-5 |
| | | | 3 | IDET-6 |
| | 17:00~18:00 (SCENE 3) | IDT-2 | 1 | IDET-7 |
| | | | 2 | IDET-8 |
| | | | 3 | IDET-9 |
| | ... | ... | ... | ... |

| EFFECT TEMPLATE ID | EFFECT TEMPLATE |
|---|---|
| IDET-1 | FALLING FLOWER PETALS (QUANTITY OF FLOWER PETALS : SMALL) |
| IDET-2 | FALLING FLOWER PETALS (QUANTITY OF FLOWER PETALS : MEDIUM) |
| IDET-3 | FALLING FLOWER PETALS (QUANTITY OF FLOWER PETALS : LARGE) |
| IDET-4 | FALLING FLOWER PETALS |
| IDET-5 | FOG |
| IDET-6 | FIREWORKS |
| ... | ... |

Fig. 13A

| CONTENT ID | SCENE ID | TIME POINT |
|---|---|---|

Fig. 13B

| CONTENT ID | SCENE ID | TIME POINT |
|---|---|---|
| XXX | IDT-1 (SCENE 1) | 10:30 |
|  | IDT-2 (SCENE 2) | 13:20 |
|  | IDT-3 (SCENE 3) | 17:00 |
|  | ⋮ | ⋮ |

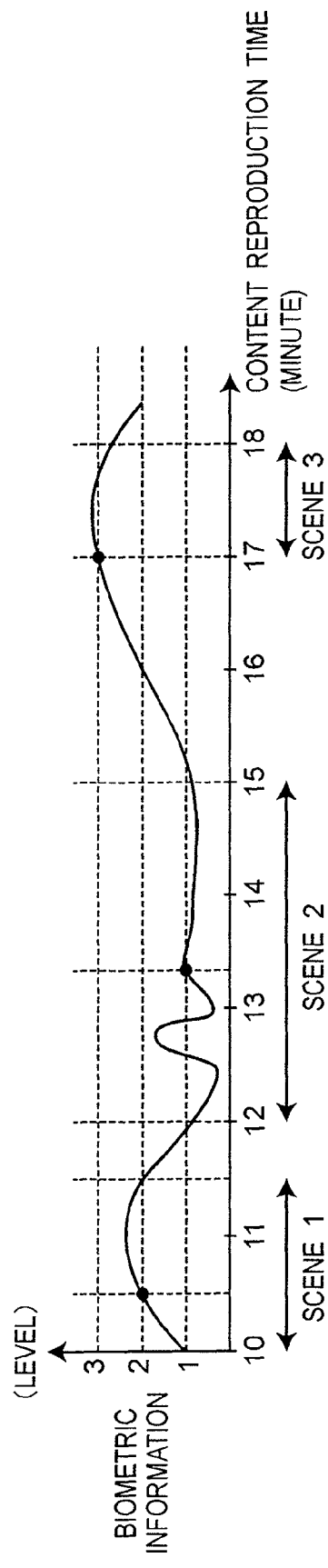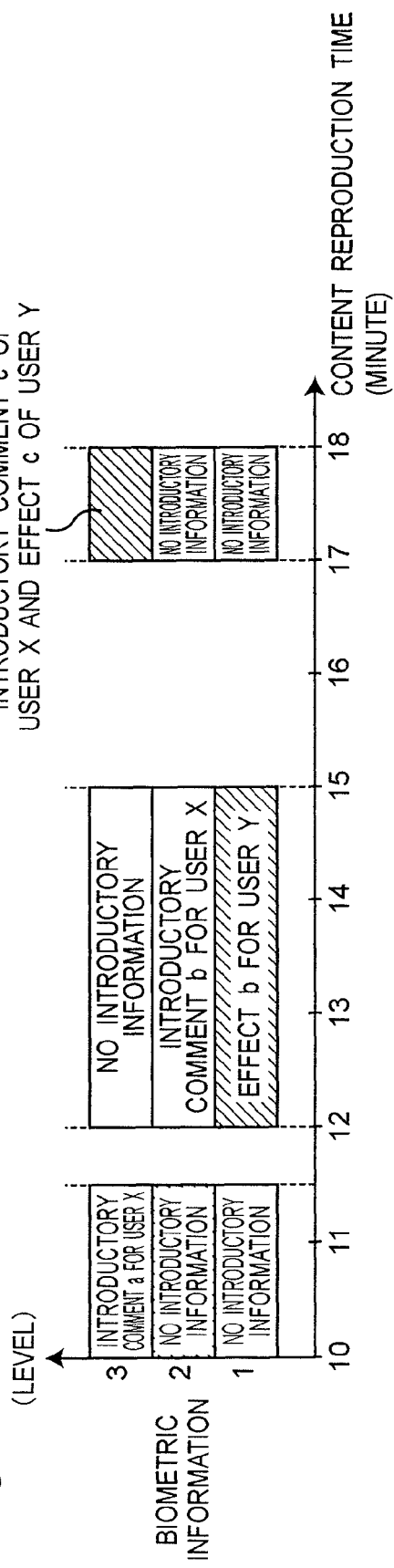

CONTENTS INFORMATION REPRODUCING APPARATUS, CONTENTS INFORMATION REPRODUCING SYSTEM, CONTENTS INFORMATION REPRODUCING METHOD, CONTENTS INFORMATION REPRODUCING PROGRAM, RECORDING MEDIUM AND INFORMATION PROCESSING APPARATUS

BACKGROUND OF THE INVENTION

1. Technical Field

The present invention relates to a content information reproducing apparatus, a content information reproducing system, and a content information reproducing method whereby a user creates an introductory comment, such as a review, for scenes in video content and the created introductory comment is presented in the video content when another user views the video content, and relates more particularly to a content information reproducing apparatus, a content information reproducing system, a content information reproducing method, a content information reproducing program, a recording medium and an information processing apparatus that considers biometric information about the user.

2. Related Art

Technology enabling viewers to interact and exchange experiences over a network while viewing video content is known from the literature. Japanese Unexamined Patent Appl. Pub. JP-A-2007-140670, for example, teaches an information-providing apparatus that presents introductory comments for individual scenes of video content to the user in real time with the video content. Because this enables communicating with other users while viewing the video content, users can view the video content with greater enjoyment while deepening their understanding of the content.

However, because this information-providing apparatus of the related art enables the users to create any number of introductory comments, a plurality of introductory comments may be displayed for one scene, and it can be very difficult for the user to read all of the introductory comments at the same time while also viewing the video content.

Furthermore, because there is no means of communication between the users that create the introductory comments and the video content distributor or creator, the intent of the video content distributor or creator cannot be clearly communicated to the users.

Moreover, a user may have forgotten what the user felt about a particular scene when creating the introductory comments after finishing viewing the video content, resulting possibly in the user creating introductory comments that differ from the user's intention while viewing the content or even forgetting to write an introductory comment.

SUMMARY OF THE INVENTION

The present invention is directed to solving this problem of the related art, and an object of the invention is to provide a content information reproducing apparatus, a content information reproducing system, and a content information reproducing method that presents introductory comments reflecting the intent of the video content distributor or creator, the introductory comments being produced by other users that are similar on a biometric information level to the user viewing the video content.

A further object of the invention is to provide a content information reproducing apparatus, a content information reproducing system, a content information reproducing method, a content information reproducing program, a recording medium therefor, and an information processing apparatus that facilitate creating introductory comments as intended by the user when the introductory comments are created after the user finishes viewing the video content.

A first aspect of the invention is a content information reproducing apparatus including a content acquisition unit that acquires content, a content reproduction unit that reproduces the content acquired by the content acquisition unit, a reception unit that receives an introductory information template set correlating a plurality of biometric information levels for each scene of the content with introductory information templates related to the biometric information levels, a biometric information input unit that inputs biometric information from a user (introductory comment creator), an introductory information creation unit that during content reproduction determines the biometric information level in each scene of the content from the biometric information input by the biometric information input unit, extracts an introductory information template related to the detected biometric information level from the introductory information template set received by the reception unit, and creates introductory information, an introductory information display unit that after content reproduction ends displays the introductory information created by the introductory information creation unit, and a transmission unit that transmits the introductory information created by the introductory information creation unit.

The content information reproducing apparatus according to another aspect of the invention also has an introductory information editing unit for editing introductory information created by the introductory information creation unit, and the transmission unit transmits the introductory information edited by the introductory information editing unit.

The biometric information level of each scene of the content determined by the introductory information creation unit is preferably a level calculated from an average of the biometric information measured when a specific scene of the content is reproduced.

Alternatively, the biometric information level of each scene of the content determined by the introductory information creation unit is a level calculated from the maximum value of the biometric information measured when a specific scene of the content is reproduced.

Further alternatively, the introductory information creation unit acquires the image reproduced during the reproduction period corresponding to the level calculated from the maximum value of the biometric information that was measured when a specific scene of the content was reproduced, and creates the introductory information.

The introductory information template may be an introductory comment template.

The introductory information template may also be an effect template.

Another aspect of the invention is a content information reproducing apparatus including a content acquisition unit that acquires content, a content reproduction unit that reproduces the content acquired by the content acquisition unit, a reception unit that receives an introductory information template set correlating a plurality of biometric information levels for each scene of the content with introductory information templates related to the biometric information levels, a biometric information input unit that inputs biometric information from a user, and an introductory information extraction unit that during content reproduction determines the biometric information level in each scene of the content from the biometric information input by the biometric information input unit, and extracts introductory information related to the detected biometric information level from the introductory information set received by the reception unit. The content reproduction unit displays the introductory information extracted by the introductory information extraction unit together with the content being reproduced.

Further preferably, the introductory information includes a time point for each scene of the content, and the introductory information extraction unit determines the biometric information level from the biometric information of the user at the time point, and extracts introductory information related to the identified biometric information level.

A content information reproducing system according to another aspect of the invention has the foregoing content information reproducing apparatus, and a biometric information measuring device that measures biometric information of a user and outputs the measured biometric information to the biometric information input unit.

Another aspect of the invention is a content information reproducing method that includes a content acquisition step of acquiring content, a content reproduction step of reproducing the content acquired in the content acquisition step, a reception step of receiving an introductory information template set correlating a plurality of biometric information levels for each scene of the content with introductory information templates related to the biometric information levels, a biometric information input step of inputting biometric information from a user, an introductory information creation step that during content reproduction determines the biometric information level in each scene of the content from the biometric information input in the biometric information input step, extracts an introductory information template related to the detected biometric information level from the introductory information template set received in the reception step, and creates introductory information, an introductory information display step of displaying the introductory information created in the introductory information creation step after control reproduction ends, and a transmission step that transmits the introductory information created in the introductory information creation step.

A content information reproducing method according to another aspect of the invention includes a content acquisition step of acquiring content, a content reproduction step of reproducing the content acquired in the content acquisition step, a reception step of receiving an introductory information set correlating a plurality of biometric information levels for each scene of the content with introductory information related to the biometric information levels, a biometric information input step of inputting biometric information from a user, and an introductory information extraction step that during content reproduction determines the biometric information level in each scene of the content from the biometric information input in the biometric information input step, and extracts introductory information related to the detected biometric information level from the introductory information set received in the reception step. The content reproduction step displays the introductory information extracted in the introductory information extraction step together with the content being reproduced.

Another aspect of the invention is a content information reproducing program that includes a content acquisition step of acquiring content, a content reproduction step of reproducing the content acquired in the content acquisition step, a reception step of receiving an introductory information template set correlating a plurality of biometric information levels for each scene of the content with introductory information templates related to the biometric information levels, a biometric information input step of inputting biometric information from a user, an introductory information creation step that during content reproduction determines the biometric information level in each scene of the content from the biometric information input in the biometric information input step, extracts an introductory information template related to the detected biometric information level from the introductory information template set received in the reception step, and creates introductory information, an introductory information display step of displaying the introductory information created in the introductory information creation step after control reproduction ends, and a transmission step that transmits the introductory information created in the introductory information creation step.

A content information reproducing program according to another aspect of the invention includes a content acquisition step of acquiring content, a content reproduction step of reproducing the content acquired in the content acquisition step, a reception step of receiving an introductory information set correlating a plurality of biometric information levels for each scene of the content with introductory information related to the biometric information levels, a biometric information input step of inputting biometric information from a user, and an introductory information extraction step that during content reproduction determines the biometric information level in each scene of the content from the biometric information input in the biometric information input step, and extracts introductory information related to the detected biometric information level from the introductory information set received in the reception step. The content reproduction step displays the introductory information extracted in the introductory information extraction step together with the content being reproduced.

A recording medium according to another aspect of the invention records the content information reproducing program of the invention.

Another aspect of the invention is an information processing apparatus including a content acquisition unit that acquires content, a content reproduction unit that reproduces the content acquired by the content acquisition unit, a reception unit that receives an introductory information template set correlating a plurality of biometric information levels for each scene of the content with introductory information templates related to the biometric information levels, an introductory information creation unit that during content reproduction determines the biometric information level in each scene of the content from the biometric information input by the biometric information input unit, extracts an introductory information template related to the detected biometric information level from the introductory information template set received by the reception unit, and creates introductory information, and a transmission unit that transmits the introductory information created by the introductory information creation unit.

An information processing apparatus according to another aspect of the invention includes a content acquisition unit that acquires content, a content reproduction unit that reproduces the content acquired by the content acquisition unit, a reception unit that receives an introductory information set correlating a plurality of biometric information levels for each scene of the content with introductory information related to the biometric information levels, and an introductory information extraction unit that during content reproduction determines the biometric information level in each scene of the content from the biometric information input by the biometric information input unit, and extracts introductory information related to the detected biometric information level from the introductory information set received by the reception unit. The content reproduction unit displays the introductory information extracted by the introductory information extraction unit together with the content being reproduced.

EFFECT OF THE INVENTION

The content information reproducing apparatus, content information reproducing system, and content information reproducing method according to the present invention can select introductory information such as introductory comments and effects corresponding to the biometric information level of the user without intervention by the user.

Furthermore, because the introductory information templates reflect the opinion of the content distributor or other users, a user can edit and recreate introductory information with consideration for the opinion of the content distributor or other users.

Furthermore, when the average of the biometric information in a specified time period is used to calculate the biometric information level and the introductory information is created after finishing viewing the content, the user can easily recall the user's emotions when viewing the content and can thus easily create an introductory comment by displaying images of the content that was displayed before and after the biometric information peaked.

It is also possible to only display introductory information that matches the biometric information level of the user while viewing the content. As a result, it is possible to display only the introductory comments corresponding to the degree of emotion shown by the user. In addition, filtering the introductory information is possible when viewing content to which much introductory information has been added together with the introductory information. Yet further, by using time points as the timing for measuring the biometric information that is used to display whether or not to display introductory information, variation in the biometric information resulting from viewing the content, and the operation of displaying or not displaying the introductory information, can be synchronized.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows an example of an introductory comment template set.

FIG. 4 shows an example of biometric information stored in the biometric information storage unit 12 and a received introductory comment template set.

FIG. 5 shows an example of information after primary processing.

FIG. 6 shows an example of information after secondary processing.

FIG. 7 show an example of the introductory information data structure and an example of introductory information.

FIG. 11 shows an example of an effect template set.

FIG. 13 shows an example of the data structure of time point information and an example of time point information.

FIG. 15 shows an example of the biometric information stored in the biometric information storage unit 12 and an example of the received introductory information.

DETAILED DESCRIPTION OF THE PREFERRED EMBODIMENTS

Figure 1:
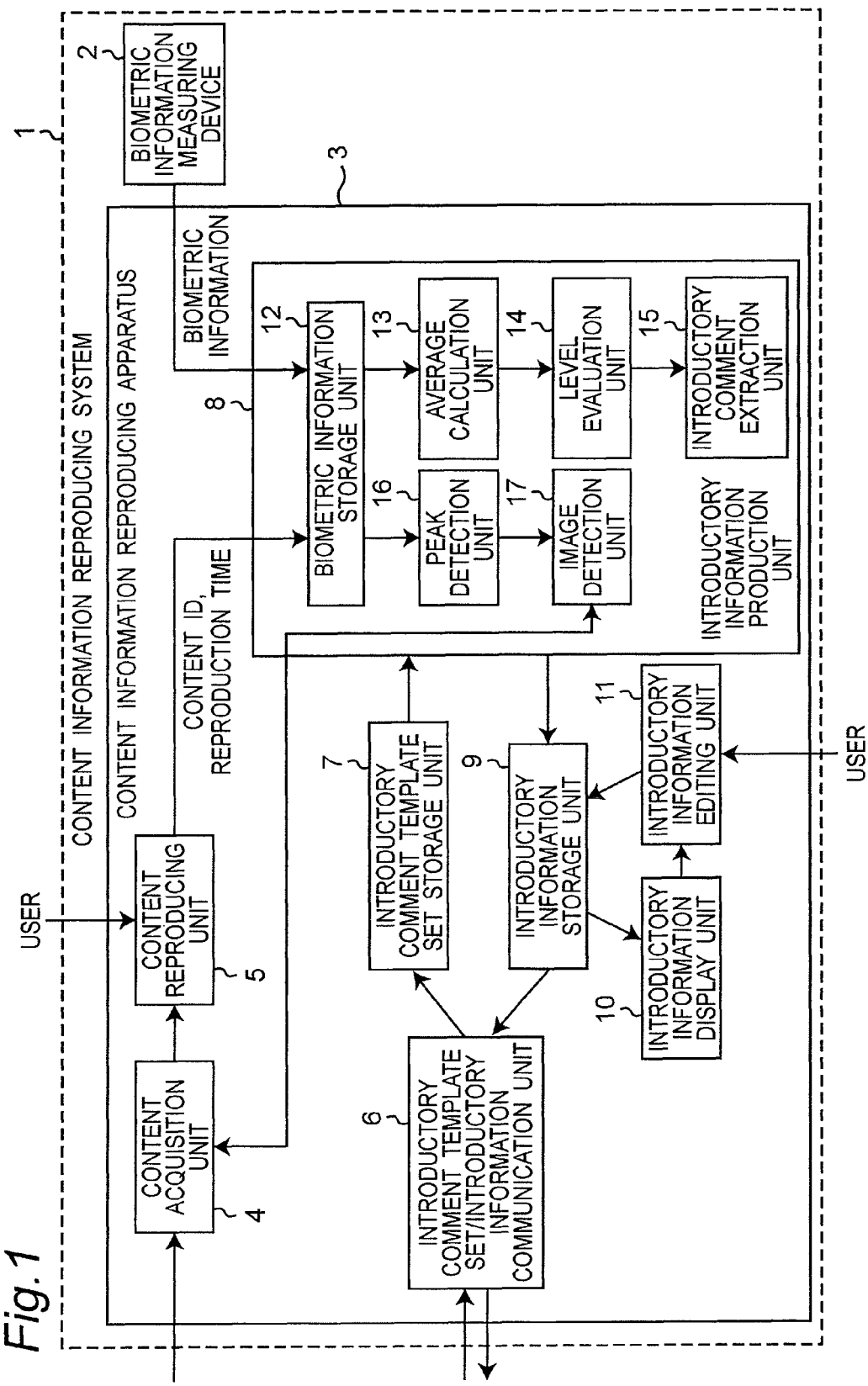
FIG. 1 is a block diagram showing the configuration of a content information reproducing system according to a first embodiment of the invention.

Preferred embodiments of a content information reproducing system according to the present invention are described below with reference to the accompanying figures. Note that like parts are identified by like reference numerals in each of the following embodiments.

Embodiment 1

This embodiment of the invention describes a content information reproducing system that extracts an introductory comment template corresponding to a biometric information level of the introductory information creator that is viewing the content from an introductory information template set containing various introductory information templates that are configured for each scene according to various biometric information levels, correlating the biometric information levels and the extracted introductory information templates and creating introductory information, and displaying the created introductory information. A content information reproducing system that edits created introductory information and outputs the edited introductory information is also described.

Configuration of a Content Information Reproducing System

FIG. 1 is a block diagram showing the configuration of a content information reproducing system according to a first embodiment of the invention. The content information reproducing system 1 has a biometric information measuring device 2 for obtaining specific biometric information, such as the pulse rate, from the user, and a content information reproducing apparatus 3 that reproduces content and creates introductory information based on an introductory comment template set and biometric information for the user viewing the content. The content information reproducing system 1 is, for example, a head-mounted display (HMD) device such as shown in FIG. 2.

Figure 2:
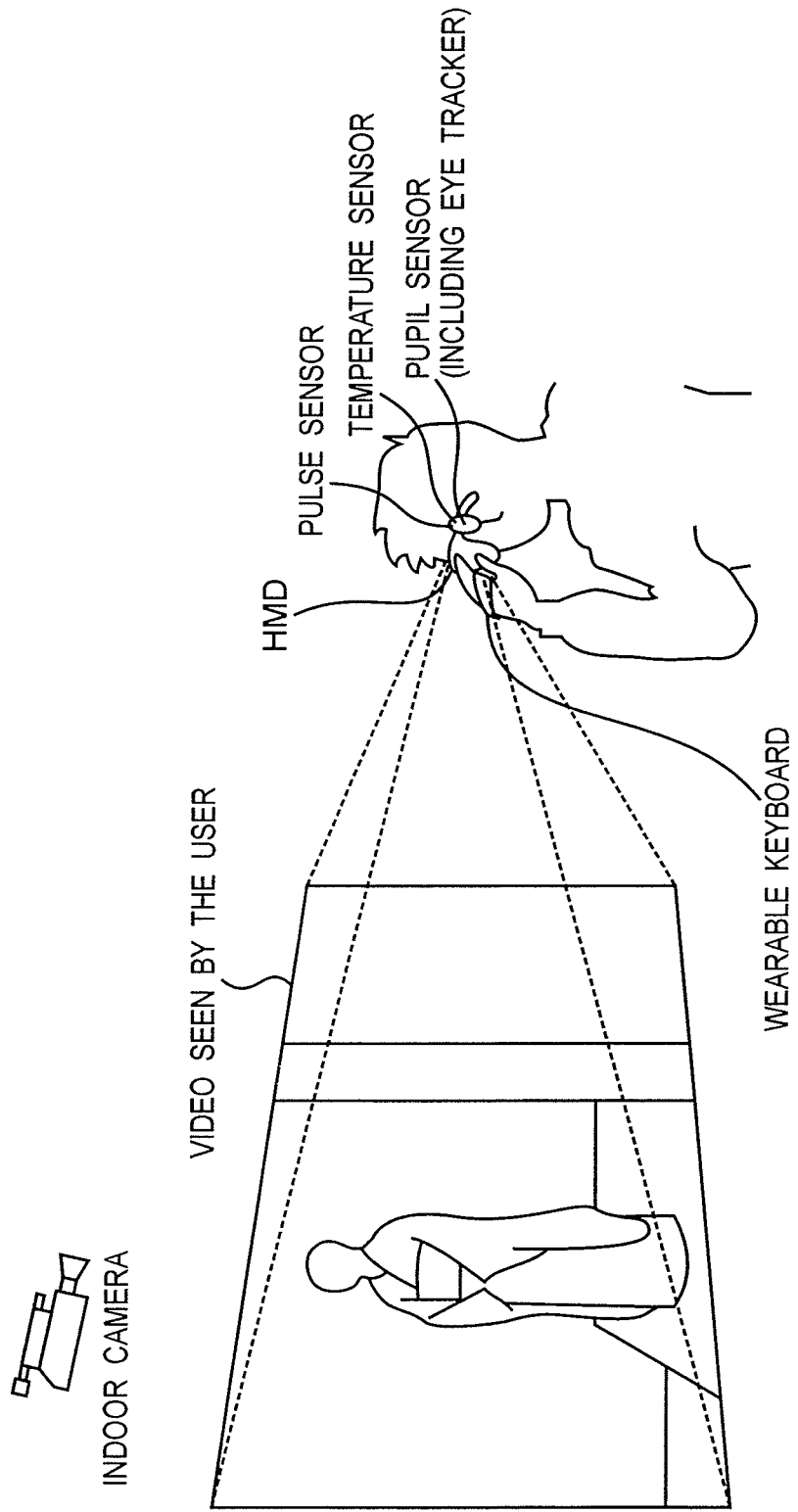
FIG. 2 shows a user wearing a head-mounted display.

In addition to a display, the head-mounted display shown in FIG. 2 may also have a pulse sensor for measuring the user's pulse, a temperature sensor for measuring body temperature, a pupil sensor for measuring the size of the pupils, an eye-tracking sensor for measuring movement of the point of gaze, or a wearable keyboard, for example. In this configuration the biometric information measuring device 2 may have just one or a combination of plural sensing devices selected from a group including a pulse sensor, temperature sensor, pupil sensor, and eye-tracking sensor, for example. An indoor camera may also be installed at a position where the user can be imaged, and used to measure the pupil size or measure eye movement, for example. The biometric information level corresponds to the degree of change in user emotion. The degree of change in user emotion can therefore be predicted from the biometric information level.

The content information reproducing apparatus 3 includes a content acquisition unit 4 that acquires content from a content server or broadcasting station, and a content reproducing unit 5 that reproduces the content acquired by the content acquisition unit 4 when triggered by user input. The content acquisition unit 4 may acquire the content wirelessly through an antenna or it may acquire content through a wired connection to the Internet, for example. The content reproducing unit 5 may output a video signal from decoded content, or it may output content after format conversion.

The content information reproducing apparatus 3 also has an introductory comment template set/introductory information communication unit 6 that receives an introductory comment template set and outputs introductory information, an introductory comment template set storage unit 7 that stores the introductory comment template set received by the introductory comment template set/introductory information communication unit 6, and an introductory information production unit 8 that creates introductory information based on the introductory comment template set stored in the introductory comment template set storage unit 7 and the biometric information for the user measured by the biometric information measuring device 2.

The introductory comment template set/introductory information communication unit 6 may send and receive data wirelessly through an antenna, or it may send and receive information through a wired connection through the Internet, for example.

The introductory comment template set is produced in advance by the content distributor. The introductory comment template set stores various introductory comment templates preconfigured for various biometric information levels for individual scenes. A specific example is shown in FIG. 3.

Referring to FIG. 3, in the scene (scene ID: ID-1) from reproduction time 10:00-11:30, the corresponding introductory comment template ID is IDST-2 if the biometric information level of the user is 2 (a level higher than the level at rest), and the introductory comment template is "outstanding." A "scene" is the period specified by the scene time information in the introductory comment template set. More specifically, in the example shown in FIG. 3, scenes are defined for the reproduction period from 10 minutes 00 seconds to 11 minutes 30 seconds, for the reproduction period from 12 minutes 00 seconds to 15 minutes 00 seconds, and for the reproduction period from 17 minutes 00 seconds to 18 minutes 00 seconds. Note that below "m" denotes minutes, "s" denotes seconds, and a time of 10 minutes 00 seconds is written 10 m00 s. Further note that in the embodiments described below the reproduction period from 10 m00 s to 11 m30 s is referred to as scene 1, the reproduction period from 12 m00 s to 15 m00 s is referred to as scene 2, and the reproduction period from 17 m00 s to 18 m00 s is referred to as scene 3.

The introductory information production unit 8 includes a biometric information storage unit 12 to which biometric information for the user (introductory comment creator) measured by the biometric information measuring device 2 is input, and which stores the input biometric information together with the reproduction time. FIG. 4A shows an example of biometric information stored in the biometric information storage unit 12. The x-axis shows the content reproduction time, and the y-axis shows the biometric information.

The introductory information production unit 8 also has an average calculation unit 13 that calculates the average of the biometric information for each scene from the stored biometric information based on the scene time information in the introductory comment template set, a level evaluation unit 14 that evaluates the biometric information level from the calculated average of the biometric information, and an introductory comment extraction unit 15 that extracts an introductory comment template corresponding to the determined level from the introductory comment template set.

The level evaluation unit 14 in this embodiment determines the biometric information level is 1 when the biometric information is slightly higher than the level at rest, determines the biometric information level is 2 when the biometric information is higher than the level at rest, and determines the biometric information level is 3 when the biometric information is extremely higher than the level at rest. FIG. 5 shows an example of the information after the biometric information level is determined by the level evaluation unit 14. FIG. 6 shows an example of information after an introductory comment template is extracted by the introductory comment extraction unit 15. FIG. 5 and FIG. 6 are further described below.

The introductory information production unit 8 also has a peak detection unit 16 that detects the reproduction time when the biometric information peaks in each scene from the stored biometric information based on the scene time information in the introductory comment template set, and an image detection unit 17 that acquires the image that was reproduced at the reproduction time of the detected peak and assigns an image ID to the acquired image. When there are plural peaks in one scene, the peak detection unit 16 detects the reproduction time at the first detected peak.

FIG. 7A shows an exemplary data structure for the introductory information. The introductory information production unit 8 sets the level ID 20 of the introductory information to the ID of the level identified by the level evaluation unit 14, assigns an image ID to the image found by the image detection unit 17 and sets the representative image ID 21 of the introductory information to the same image ID, and sets the introductory comment 24 linked by introductory comment IDs 22 and 23 to the introductory comment template extracted by the introductory comment extraction unit 15. FIG. 7B shows an example of the introductory information.

The content information reproducing apparatus 3 also has an introductory information storage unit 9 that stores the introductory information created by the introductory information production unit 8, an introductory information display unit 10 that displays the introductory information, and an introductory information editing unit 11 whereby the introductory information is edited by the user.

Operation of the Content Information Reproducing System

Figure 8:
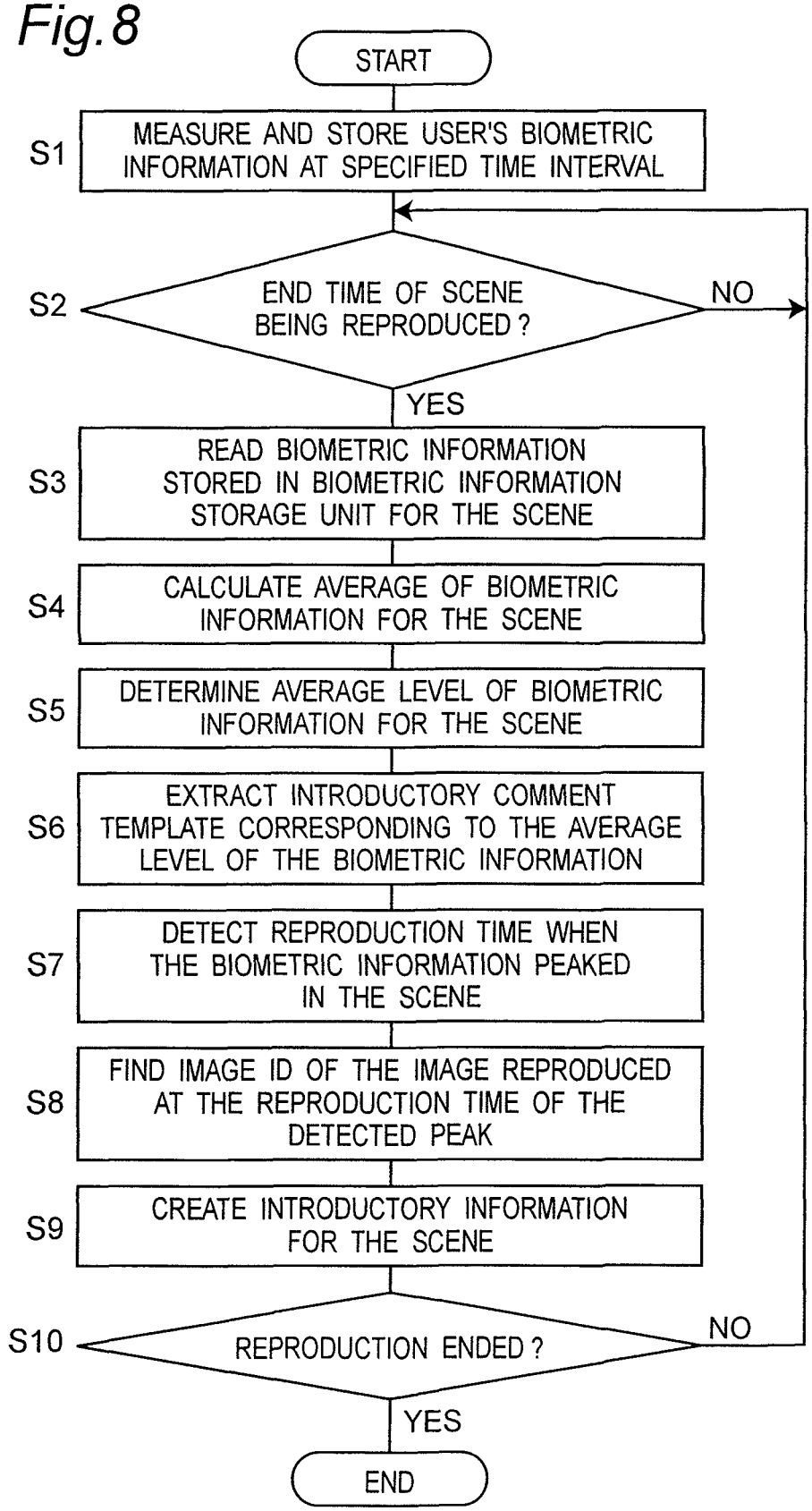
FIG. 8 is a flow chart of the introductory information creation process when the user reproduces the video content in the introductory comment creation mode.

FIG. 8 is a flow chart of the introductory information production process when the user reproduces the video content in an introductory comment creation mode.

Biometric information for the user (introductory comment creator) is continually measured by the biometric information measuring device 2 and the measured biometric information is stored in the biometric information storage unit 12 while the user is viewing content (S1). The introductory information production unit 8 determines if the reproduction time of the content is the end time of the scene being reproduced (S2). Using the introductory comment template set shown in FIG. 3, for example, the introductory information production unit 8 determines if the reproduction time of the content has reached 11 m30 s when viewing the scene that is reproduced from 10 m00 s to 11 m30 s.

If the reproduction time of the content goes to the end time of the scene being reproduced (S2 returns Yes), the biometric information for the scene that is stored in the biometric information storage unit 12 is read (S3). The average calculation unit 13 then calculates the average of the biometric information for that scene from the biometric information that was read (S4). Next, the level evaluation unit 14 determines the level of the average of the biometric information in that scene from the calculated average of the biometric information (S5). The introductory comment extraction unit 15 extracts the introductory comment template corresponding to the determined level of the biometric information average from the introductory comment template set (S6).

From the read biometric information the peak detection unit 16 then detects the reproduction time at the time the biometric information peaked in the scene (S7). Next, the image detection unit 17 acquires and assigns an image ID to the image that was reproduced at the reproduction time of the detected peak (S8). The introductory information production unit 8 then creates introductory information for the scene based on the calculated average level of the biometric information, the image ID, and the extracted introductory comment template (S9). If the average biometric information level calculated in step S5 is not level 1-3, introductory information for that scene is not created. If reproduction of content continues (S10 returns No), control returns to step S2 and introductory information is created again. However, if content reproduction has ended (S10 returns Yes), the operation described in this flow chart ends.

Figure 9:
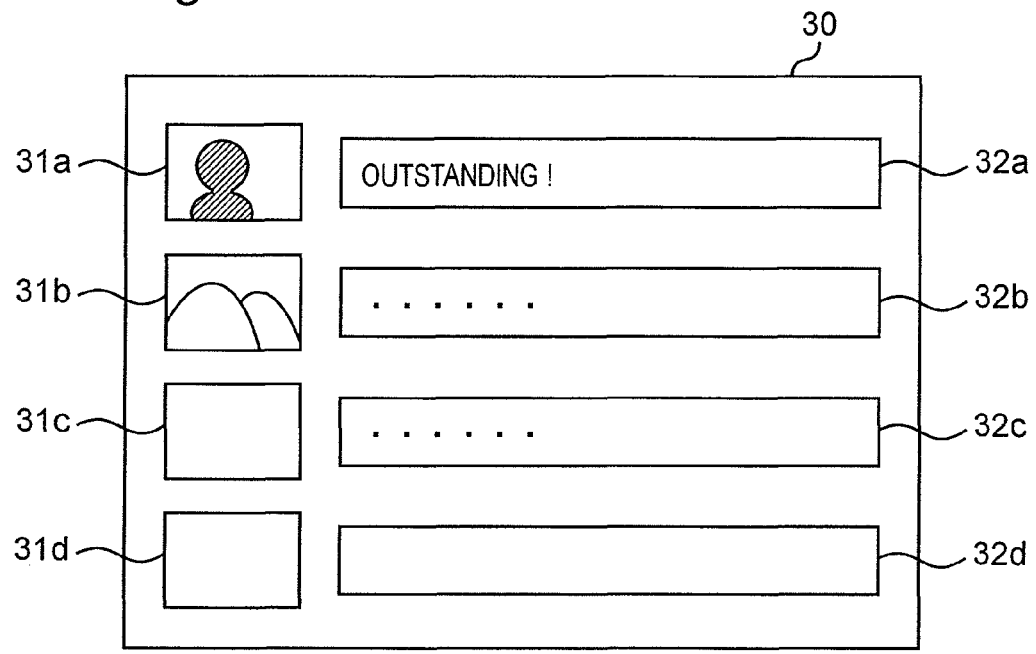
FIG. 9 shows a sample display of introductory information.

If content reproduction ends, the introductory information is displayed in a list for the user (introductory comment creator). An example of an introductory information list is shown in FIG. 9. The displayed introductory information is the information created by the introductory information production unit 8 while the content was being reproduced. One representative image 31a to 31d and one introductory comment 32a to 32d are displayed for each scene. The representative images 31a to 31d are the images corresponding to the representative image IDs stored in the introductory information, that is, the images that were reproduced at the time the biometric information peaked in each scene. The introductory comments 32a to 32d are the introductory comments stored in the introductory information, that is, the introductory comment templates corresponding to the average level of the biometric information for each scene that were extracted from the introductory comment template set.

This is described more specifically below with reference to FIG. 3 to FIG. 6 and FIG. 9.

FIG. 4A shows an example of the biometric information stored in the biometric information storage unit 12. In this example the level evaluation unit 14 determines that the average of the biometric information in scene 1 is level 2, the average of the biometric information in scene 2 is less than level 1, and the average of the biometric information in scene 3 is level 3. In this example the introductory information production unit 8 has the information shown in FIG. 5, that is, the introductory comment template set shown in FIG. 3 (the information before processing) plus the biometric information level of the user. The information added in FIG. 5 (the biometric information level of the user) is biometric information level 2 in scene 1, no applicable level in scene 2, and level 3 in scene 3.

The introductory comment extraction unit 15 extracts the introductory comment template corresponding to the determined level. Because the introductory comment templates that do not correspond are not needed at this time, the introductory information production unit 8 has information from which the introductory comment templates for levels 1 and 3 in scene 1, all levels in scene 2, and levels 1 and 2 in scene 3 are deleted as shown in FIG. 6. The deleted information is denoted by the dotted strike-through lines in FIG. 6. Because the scene time information is also not needed in the following process, the scene time information is also deleted in FIG. 6.

When the image detection unit 17 finds the image and assigns an image ID, the introductory information production unit 8 creates the introductory information shown in FIG. 7B. FIG. 7B shows the result after adding a representative image ID to the information resulting from the process shown in FIG. 6. In FIG. 7B the average of the biometric information in scene 1 is level 2, the representative image ID is IDP-1, and the introductory comment is "Outstanding." Because the average of the biometric information in scene 2 is less than level 1 (is none of levels 1 to 3), an introductory comment is not created for scene 2. The average of the biometric information in scene 3 is level 3, the representative image ID is IDPA-2, and the introductory comment ID is IDS-2.

In the example of an introductory comment display shown in FIG. 9, the image (the image of which the image ID is IDP-1) reproduced when the biometric information peaked in scene 1 is displayed as representative image 31a, and the introductory comment "outstanding" for scene 1 is displayed as introductory comment 32a. The image (the image of which the image ID is IDP-2) reproduced when the biometric information peaked in scene 3 is displayed as representative image 31b, and the introductory comment for scene 3, which has an introductory comment ID of IDS-2, is displayed as introductory comment 32b. The user cannot create an introductory comment for the video at a reproduction time from 11 m30 s to 17 m00 s.

The user can edit the introductory comments 32a to 32d. The introductory information storage unit 9 stores the edited introductory comments. More specifically, the introductory comment 24 of the introductory information in FIG. 7B is edited. The introductory comment template set/introductory information communication unit 6 sends the introductory information to the content server.

Because this embodiment of the invention creates introductory comments using an introductory comment template set previously created by the content distributor, introductory comments incorporating the intent of the content distributor are produced. In addition, an introductory comment template corresponding to the biometric information level of the user is extracted from an introductory comment template set of introductory comment templates for each biometric information level of the user for each scene, and the extracted introductory comment is displayed. Because an introductory comment that is close to the introductory comment intended to be created is displayed by using biometric information levels, it is easier for the introductory comment creator to create an introductory comment. In addition, when introductory comments are created after viewing the content, the introductory comment creator may have forgotten what their initial reaction was, and mistakes resulting from such problems can be reduced.

Variations of the Embodiment

In the embodiment described above the content information reproducing apparatus 3 receives an introductory comment template set and creates an introductory comment, which is introductory information, based on the introductory comment template set. In the embodiment described below the content information reproducing apparatus 3 receives an effect template set and based on this effect template set creates an effect as the introductory information.

Figure 10:
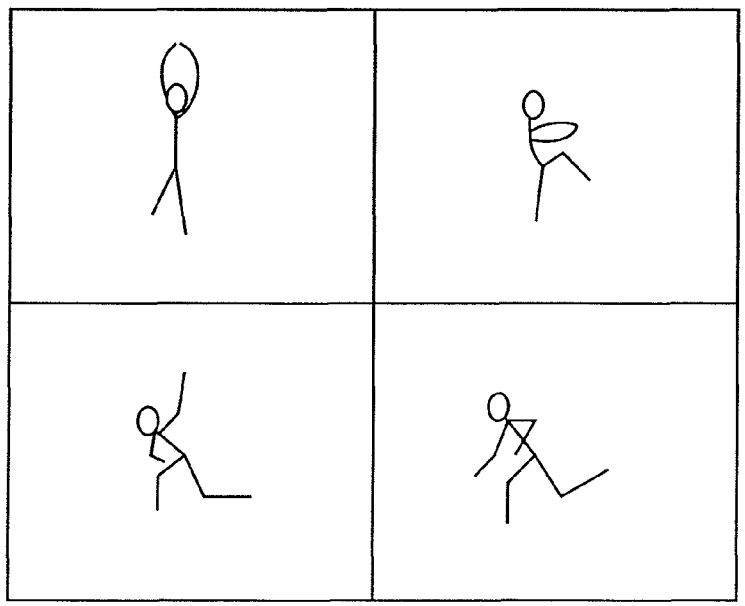
FIG. 10 shows an example of a multi-screen display.

Effects include video effects and audio effects. Video effects include, for example, zooming the reproduced image, changing the contrast or color of the reproduced image, making the reproduced video appear as if it was recorded in sunlight, moonlight, or incandescent light, or making the reproduced video appear as if it was recorded with backlighting. Other video effects include making the reproduced video appear as if it is raining or snowing, making the reproduced video appear as if there is fog, adding jet trails to the reproduced video if there is an airplane in the sky, causing flower petals to fall in the reproduced video, adding cartoon characters and speech balloons, and adding fireworks, lightning, and other images to the reproduced video. Yet other video effects include a multi-screen display in which, for example, the display is divided into four parts and video is displayed at a specific time offset sequentially in the top left, top right, bottom left, and bottom right display areas. FIG. 10 shows an example of such a multi-screen display. In a scene of a baseball pitcher pitching the ball, an image of the pitcher when starting his windup is shown in the top left area, an image 0.1 second later is shown in the top right area, an image 0.2 second later is shown in the bottom left area, and an image of the pitcher after throwing the ball is shown in the bottom right area.

Audio effects include rendering the audio as a chorus, adding a delayed sound to the reproduced audio to produce a unique man-made sound using the waveform interference of the two sounds (flanging), delaying the reproduced audio (delay), changing the quality of the reproduced audio (reverb), adding effect sounds, and adding background music.

FIG. 11 shows an example of an effect template set. The intensity (strength) of an effect is changed according to the biometric information level of the user in scene 1 at a reproduction time from 10 m00 s to 11 m30 s. More specifically, when the average of the biometric information is level 1, a small quantity of flower petals float through the reproduced video. When the average of the biometric information is level 2, a medium quantity of flower petals fall through the reproduced video. When the average of the biometric information is level 3, a large quantity of flower petals fall through the reproduced video. In scene 2 at a reproduction time from 12 m00 s to 15 m00 s, the type of effect is changed according to the biometric information level of the user. More specifically, when the average of the biometric information is level 1, flower petals are made to float through the reproduced video. When the average of the biometric information is level 2, the scene in the reproduced video is covered in mist. When the average of the biometric information is level 3, an image of fireworks is added to the reproduced video.

Note that an introductory comment template is extracted from an introductory comment template set based on the average level of the biometric information. However, an introductory comment template may be extracted from the introductory comment template set based on the peak level of the biometric information instead. Further alternatively, an introductory comment template may be extracted from the introductory comment template set based on the level of the biometric information at a reproduction time specified in advance by the content distributor.

Note, further, that this embodiment of the invention displays the image that was reproduced when the biometric information peaked in each scene when the introductory information is reproduced, but an image that was previously selected by the content distributor may be displayed instead. In this case a representative image ID is added to the introductory comment template set.

Note, further, that while this embodiment of the invention only displays the introductory information after content reproduction ends, the introductory comments may be displayed together with the content as each scene is reproduced. In this case the introductory information production unit 8 outputs the extracted introductory comment template to the content reproducing unit 5 after step S6 in FIG. 8, and the content reproducing unit 5 displays the introductory comment template in a position that does not interfere with the content.

Embodiment 2

This embodiment of the invention describes a content information reproducing system that presents together with the video content introductory information that was produced according to the first embodiment described above by an introductory comment creator with a biometric information level similar to that of the introductory information viewer that is observing the content.

Configuration of a Content Information Reproducing System

Figure 12:
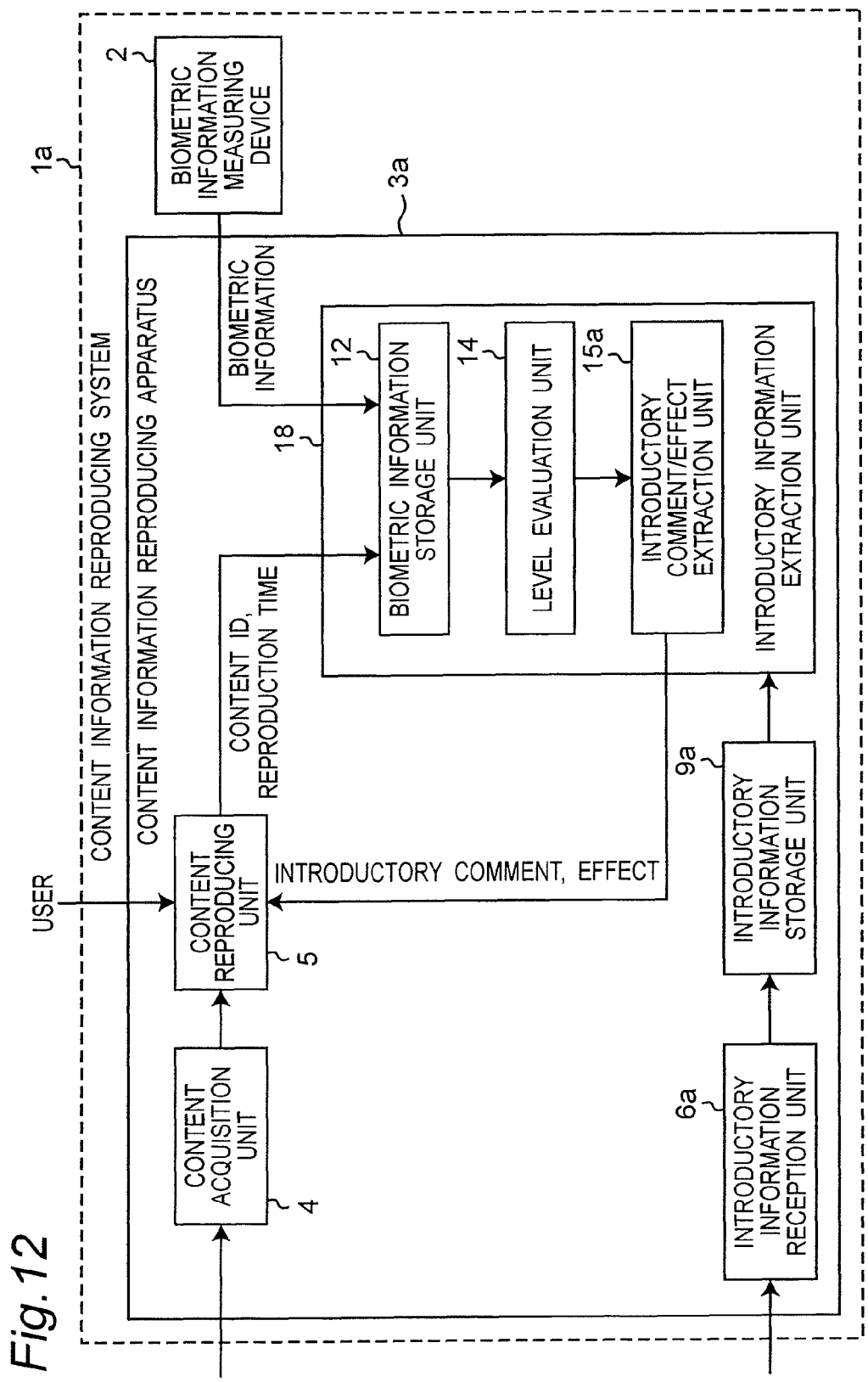
FIG. 12 is a block diagram showing the configuration of a content information reproducing system according to a second embodiment of the invention.

FIG. 12 is a block diagram showing the configuration of a content information reproducing system according to a second embodiment of the invention. The content information reproducing system 1a has a biometric information measuring device 2 for obtaining specific biometric information, such as the pulse rate, from the user, and a content information reproducing apparatus 3a that reproduces content and displays introductory information (introductory comments, effects) based on the biometric information for the user viewing the content.

The content information reproducing apparatus 3a includes a content acquisition unit 4 that acquires content from a content server or broadcasting station, and a content reproducing unit 5 that reproduces the content acquired by the content acquisition unit 4 based on user input.

The content information reproducing apparatus 3a also has an introductory information reception unit 6a that receives introductory information, an introductory information storage unit 9a that stores the introductory information received by the introductory information reception unit 6a, and an introductory information extraction unit 18 that extracts introductory information based on the introductory information stored in the introductory information storage unit 9a and the user's biometric information measured by the biometric information measuring device 2. The data structure of the received introductory information is the introductory information shown in FIG. 7A with the addition of the time point information shown in FIG. 13A. The introductory information shown in FIG. 7B is created by the introductory comment creator as described in the first embodiment, and the time point information shown in FIG. 13B is created in advance by the content distributor according to the change anticipated in the biometric information of the user while viewing the content.

The introductory information extraction unit 18 includes a biometric information storage unit 12 to which biometric information for the user (introductory comment viewer) measured by the biometric information measuring device 2 is input and which stores the input biometric information together with the reproduction time, a level evaluation unit 14 that determines the biometric information level from the biometric information at that time point in the introductory information, and an introductory comment/effect extraction unit 15a that extracts an introductory comment/effect based on the detected biometric information level.

Operation of the Content Information Reproducing System

Figure 14:
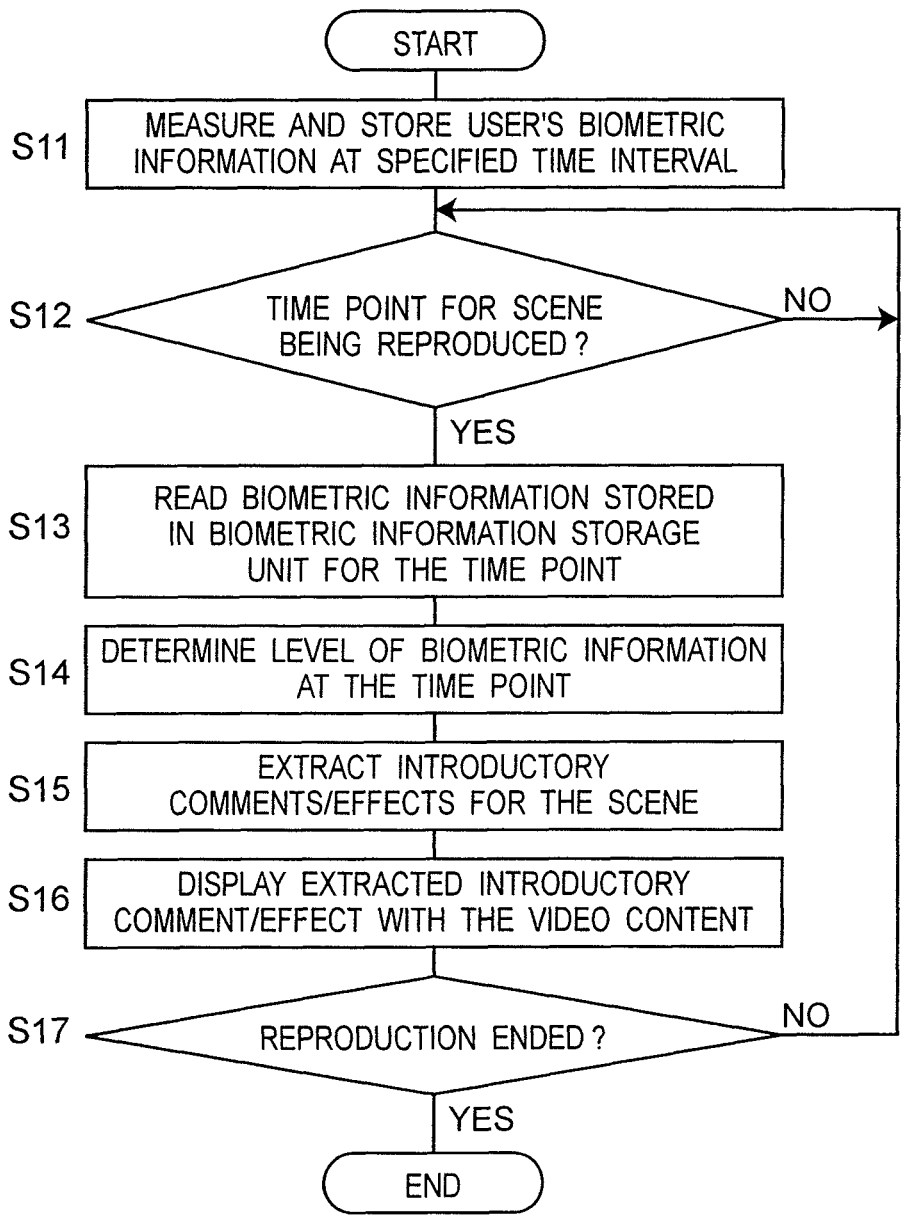
FIG. 14 is a flow chart showing the introductory information extraction process when the user reproduces video content in the introductory information viewing mode.

FIG. 14 is a flow chart of the introductory information extraction process when a user reproduces the video content in the introductory information viewing mode.

When the user views the content, the biometric information measuring device 2 measures biometric information from the user at a predetermined interval, and continues storing the measured biometric information in the biometric information storage unit 12 (S11). The introductory information extraction unit 18 determines if the reproduction time of the content has reached a time point in the scene being viewed (S12). If the reproduction time of the content reaches the time point set for the scene being reproduced (S12 returns Yes), the biometric information for that time point stored in the biometric information storage unit 12 is read (S13).

The level evaluation unit 14 evaluates the biometric information level at that time point from the biometric information read from memory (S14). Based on the detected biometric information level, the introductory comment/effect extraction unit 15a extracts the introductory comment/effect for that scene (S15). More specifically, in the data structure of the introductory information shown in FIG. 7A, the introductory comment (effect) acquired by specifying a content ID, time ID, and level ID is the introductory comment/effect in that scene. The extracted introductory comment/effect is output to the content reproducing unit 5 and displayed together with the video content (S16). While content reproduction continues (S17 returns No), control returns to step S2 and introductory information is extracted again. When content reproduction is finished (S17 returns Yes), the operation described in this flow chart ends.

This is described more specifically with reference to FIG. 3, FIG. 13, and FIG. 15. An example of the time point information is shown in FIG. 13B.

The time point in scene 1 (scene ID: IDT-1) is 10 m30 s, and the biometric information at reproduction time 10 m30 s is level 2 in the biometric information stored in the biometric information storage unit 12 shown in FIG. 15A. Because there is no level 2 introductory information in the biometric information for scene 1 in the received introductory information in FIG. 15B, introductory information is not displayed for this scene.

The time point in scene 2 (scene ID: IDT-2) is 13 m20 s (see FIG. 13B), and the biometric information is level 1 at reproduction time 13 m20 s in FIG. 15A. In FIG. 15B the introductory information for biometric information level 1 in scene 2 is effect b of user Y. Effect b is therefore applied in this scene.

In addition, the time point in scene 3 (scene ID: IDT-3) is 17 m00 s (see FIG. 13B), and the biometric information is level 3 at reproduction time 17 m00 s in FIG. 15A. In FIG. 15B the introductory information for biometric information level 3 in scene 3 is introductory comment c of user X and effect c of user Y. Introductory comment c is therefore displayed and effect c is applied in this scene.

This aspect of the invention extracts the introductory information corresponding to the biometric information level of the user viewing the content from the received introductory information, and displays the extracted introductory information together with the content being reproduced. As a result, because introductory information created by another user (introductory comment creator) having a biometric information level similar to the current user (introductory comment viewer) is selected and displayed, events such as displaying introductory information reflecting a much different emotion, or displaying more introductory information than can be read by the content viewer, can be reduced.

Note that, as described in the first embodiment, a list of introductory information displayed during reproduction using the introductory information of other users as an introductory comment template set may be displayed after content reproduction ends, and the introductory information may be edited. In this case, the edited introductory information is stored, and the stored introductory information is sent to the content server as the introductory information of the user.

The content information reproducing system described in the foregoing embodiments may be used as a part of another device, including portable electronic devices such as cell phones, consumer AV equipment such as televisions and optical disc players, peripheral devices for consumer AV equipment such as remote control devices, consumer game machines, personal computers, printers and other peripheral devices for personal computers, and microwave ovens and other home appliances.

Each of the component devices described above is disposed inside the content information reproducing apparatus in the foregoing embodiments, but some of these components may be disposed outside the content information reproducing apparatus or connected through a network to the content information reproducing apparatus.

Separate component devices may also communicate with each other in the foregoing embodiments through an operating system.

Note that the content may be MPEG2, MPEG4 or other type of video content, AAC (Advanced Audio Coding) or other type of audio information, a data structure markup language such as HTML (HyperText Markup Language) or BML (Broadcast Markup Language), JPEG (Joint Photographic Experts Group), PNG (Portable Network Graphics) or other type of image data, or metadata or a script such as EcmaScript.

Note, further, that the foregoing embodiments are achieved by a CPU interpreting and executing specific program data that is stored on a storage device (including, for example, ROM, RAM, or hard disk drive) and enables executing the steps of the processes described herein. In this aspect of the invention the program data may be introduced to the storage device through a recording medium or may be executed directly from the recording medium. Note that such recording media include, for example, semiconductor memory devices such as ROM, RAM, and flash memory, magnetic disk storage media including floppy disks and hard disks, optical disc media such as CD-ROM, DVD, and Blu-ray disc media, and memory cards. Note, further, that recording media as used herein is a concept that also includes communication media such as telephone lines and communication paths.

Yet further, the function blocks of the content information reproducing apparatus 3 or 3a are typically achieved by means of LSI devices. These may be rendered individually as discrete chips or part or all may be rendered using a single chip. Furthermore, while "LSI" device is used generically for convenience, other terms such as IC, system LSI, super-LSI, and ultra-LSI may be used due to differences in the degree of integration. The method of circuit integration is also not limited to LSI methods, and dedicated circuits or a general purpose processor may be used. Further alternatively, a FPGA (field programmable gate array) enabling programming after LSI device manufacture, or a configurable processor enabling reconfiguring settings and connections between the circuit cells inside the LSI device after LSI device manufacture may be used. It will also be obvious that as circuit integration technologies replacing LSI device technologies are developed through advances in semiconductor technology and other technologies yet to emerge, said technologies may also be used to integrate the function blocks described above. The use of biotechnology is also conceivable.

Industrial Application

The content information reproducing system according to the present invention has the effect of facilitating an introductory comment creator creating introductory information while also creating introductory information reflecting the intent of the content distributor or other users, and is valuable as a consumer-grade content information reproducing system.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A content information reproducing apparatus, comprising:
   a content acquirer, embodied by a processor, that acquires content;
   a content reproducer, embodied by a processor, that reproduces the content acquired by the content acquirer;
   a receiver that receives an introductory information template set including a plurality of correlations of biometric information levels for each scene of a plurality of scenes in the content with introductory information templates related to the biometric information levels;
   a biometric information inputter that inputs biometric information from a user;
   an introductory information creator, embodied by a processor, that during content reproduction determines the biometric information level in each scene of the content from the biometric information input by the biometric information inputter, extracts an introductory information template related to the detected biometric information level from the introductory information template set received by the receiver, and creates introductory information;
   a transmitter that transmits the introductory information created by the introductory information creator; and
   an introductory information storage which stores a table including a list of scene information of the scenes and a list of the introductory comments obtained from the introductory information templates, wherein the scenes and the introductory comments are linked by associating a plurality of identifiers of the scenes with a plurality of identifiers of the introductory comments, and wherein the introductory comments are obtained from the introductory information templates relatively to the inputted levels of the biometric information.

2. The content information reproducing apparatus of claim 1, further comprising:
   an introductory information editor for editing introductory information created by the introductory information creator;
   wherein the transmitter transmits the introductory information edited by the introductory information editor.

3. The content information reproducing apparatus of claim 1, wherein the biometric information level of each scene of the content determined by the introductory information creator is a level calculated from an average of the biometric information measured when a specific scene of the content is reproduced.

4. The content information reproducing apparatus of claim 1, wherein the biometric information level of each scene of the content determined by the introductory information creator is a level calculated from a maximum value of the biometric information measured when a specific scene of the content is reproduced.

5. The content information reproducing apparatus of claim 1, wherein: the introductory information creator acquires an image reproduced during the reproduction period corresponding to the level calculated from a maximum value of the biometric information that was measured when a specific scene of the content was reproduced, and creates introductory information using the acquired image.

6. The content information reproducing apparatus of claim 1, wherein: the introductory information template is an introductory comment template.

7. The content information reproducing apparatus of claim 1, wherein: the introductory information template is an effect template.

8. A content information reproducing system, comprising:
   the content information reproducing apparatus of claim 1; and
   a biometric information measurer that measures biometric information of a user and outputs the measured biometric information to the biometric information inputter.

9. The content information reproducing apparatus of claim 1, further comprising: an introductory information display that, when content reproduction is completed, displays the introductory information created by the introductory information creator.

10. A content information reproducing apparatus, comprising:
    a content acquirer, embodied by a processor, that acquires content;
    a content reproducer, embodied by a processor, that reproduces the content acquired by the content acquirer;
    a receiver that receives an introductory information set including a plurality of correlations of biometric information levels for each scene of a plurality of scenes in the content with introductory information related to the biometric information levels;
    a biometric information inputter that inputs biometric information from a user;
    an introductory information extractor, embodied by a processor, that during content reproduction determines the biometric information level in each scene of the content from the biometric information input by the biometric information inputter, and extracts introductory information related to the detected biometric information level from the introductory information set received by the receiver;
    the content reproducer displaying the introductory information extracted by the introductory information extractor together with the content being reproduced; and
    an introductory information storage which stores a table including a list of scene information of the scenes and a list of the introductory comments obtained from the introductory information, wherein the scenes and the introductory comments are linked by associating a plurality of identifiers of the scenes with a plurality of identifiers of the introductory comments, and wherein the introductory comments are obtained from the introductory information relatively to the inputted levels of the biometric information.

11. The content information reproducing apparatus of claim 10, wherein:
    the introductory information includes a time point for each scene of the content; and
    the introductory information extractor determines the biometric information level from the biometric information of the user at the time point, and extracts introductory information related to the identified biometric information level.

12. A content information reproducing method, comprising:
    acquiring content;
    reproducing the content acquired;
    receiving an introductory information template set including a plurality of correlations of biometric information levels for each scene of a plurality of scenes in the content with introductory information templates related to the biometric information levels;

inputting biometric information from a user;

determining, during content reproduction, the biometric information level in each scene of the content from the biometric information input in the inputting of biometric information, extracting an introductory information template related to the detected biometric information level from the introductory information template set, and creating introductory information;

storing in an introductory information storage a table including a list of scene information of the scenes and a list of the introductory comments obtained from the introductory information templates, wherein the scenes and the introductory comments are linked by associating a plurality of identifiers of the scenes with a plurality of identifiers of the introductory comments, and wherein the introductory comments are obtained from the introductory information templates relatively to the inputted levels of the biometric information; and transmitting the introductory information.

13. The content information reproducing method of claim 12, further comprising:

detecting reproduction time when the biometric information peaks;

acquiring an image reproduced during the reproduction time of the biometric information peak; and assigning an image ID to the acquired image.

14. The content information reproducing method of claim 12, further comprising extracting an introductory comment template from an introductory comment template set based on at least one of an average and peak level of the biometric information.

15. A content information reproducing method, comprising:

acquiring content;

reproducing the content acquired;

receiving an introductory information set including a plurality of correlations of biometric information levels for each scene of a plurality of scenes in the content with introductory information related to the biometric information levels;

inputting biometric information from a user;

determining, during content reproduction, the biometric information level in each scene of the content from the biometric information input in the inputting of biometric information, and extracting introductory information related to the detected biometric information level from the introductory information set received;

storing in an introductory information storage a table including a list of scene information of the scenes and a list of the introductory comments obtained from the introductory information, wherein the scenes and the introductory comments are linked by associating a plurality of identifiers of the scenes with a plurality of identifiers of the introductory comments, and wherein the introductory comments are obtained from the introductory information relatively to the inputted levels of the biometric information; and displaying the introductory information extracted together with the content being reproduced.

16. A non-transitory computer readable medium storing a content information reproducing program, the program, when executed by a processor, comprising:

acquiring content;

reproducing the content acquired;

receiving an introductory information template set including a plurality of correlations of biometric information levels for each scene of a plurality of scenes in the content with introductory information templates related to the biometric information levels;

inputting biometric information from a user;

determining, during content reproduction, the biometric information level in each scene of the content from the biometric information input in the inputting of biometric information, extracting an introductory information template related to the detected biometric information level from the introductory information template set, and creating introductory information;

storing in an introductory information storage a table including a list of scene information of the scenes and a list of the introductory comments obtained from the introductory information templates, wherein the scenes and the introductory comments are linked by associating a plurality of identifiers of the scenes with a plurality of identifiers of the introductory comments, and wherein the introductory comments are obtained from the introductory information templates relatively to the inputted levels of the biometric information; and transmitting the introductory information.

17. A non-transitory computer readable medium storing a content information reproducing program, the program, when executed by a processor, comprising:

acquiring content;

reproducing the content;

receiving an introductory information set including a plurality of correlations of biometric information levels for each scene of a plurality of scenes in the content with introductory information related to the biometric information levels;

inputting biometric information from a user;

determining, during content reproduction, the biometric information level in each scene of the content from the biometric information input in the inputting of biometric information, and extracting introductory information related to the detected biometric information level from the introductory information set received;

storing in an introductory information storage a table including a list of scene information of the scenes and a list of the introductory comments obtained from the introductory information, wherein the scenes and the introductory comments are linked by associating a plurality of identifiers of the scenes with a plurality of identifiers of the introductory comments, and wherein the introductory comments are obtained from the introductory information relatively to the inputted levels of the biometric information; and displaying the introductory information extracted together with the content being reproduced.

18. An information processing apparatus, comprising:

a content acquirer, embodied by a processor, that acquires content;

a content reproducer, embodied by a processor, that reproduces the content acquired by the content acquirer;

a receiver that receives an introductory information template set including a plurality of correlations of biometric information levels for each scene of a plurality of scenes in the content with introductory information templates related to the biometric information levels;

an introductory information creator, embodied by a processor, that during content reproduction determines the biometric information level in each scene of the content from biometric information input by a biometric information inputter, extracts an introductory information template related to the detected biometric information level from the introductory information template set received by the receiver, and creates introductory information;

an introductory information storage which stores a table including a list of scene information of the scenes and a list of the introductory comments obtained from the introductory information templates, wherein the scenes and the introductory comments are linked by associating a plurality of identifiers of the scenes with a plurality of identifiers of the introductory comments, and wherein the introductory comments are obtained from the introductory information templates relatively to the inputted levels of the biometric information; and a transmitter that transmits the introductory information created by the introductory information creator.

19. An information processing apparatus, comprising:

a content acquirer, embodied by a processor, that acquires content;

a content reproducer, embodied by a processor, that reproduces the content acquired by the content acquirer;

a receiver that receives an introductory information set including a plurality of correlations of biometric information levels for each scene of a plurality of scenes in the content with introductory information related to the biometric information levels;

an introductory information extractor, embodied by a processor, that during content reproduction determines the biometric information level in each scene of the content from biometric information input by a biometric information inputter, and extracts introductory information related to the detected biometric information level from the introductory information set received by the receiver;

the content reproducer displaying the introductory information extracted by the introductory information extractor together with the content being reproduced; and an introductory information storage which stores a table including a list of scene information of the scenes and a list of the introductory comments obtained from the introductory information, wherein the scenes and the introductory comments are linked by associating a plurality of identifiers of the scenes with a plurality of identifiers of the introductory comments, and wherein the introductory comments are obtained from the introductory information relatively to the inputted levels of the biometric information.

* * * * *